United States Patent
Pithwa (10) Patent No.: US 10,476,336 B2
(45) Date of Patent: Nov. 12, 2019

(54) STATOR ASSEMBLY

(71) Applicant: Goodrich Control Systems, West Midlands (GB)

(72) Inventor: Kedar Pithwa, Middlesex (GB)

(73) Assignee: GOODRICH CONTROL SYSTEMS, West Midlands (GB)

( * ) Notice: Subject to any disclaimer, the term of this patent is extended or adjusted under 35 U.S.C. 154(b) by 252 days.

(21) Appl. No.: 15/480,650

(22) Filed: Apr. 6, 2017

(65) Prior Publication Data

US 2017/0358965 A1 Dec. 14, 2017

(30) Foreign Application Priority Data

Jun. 10, 2016 (EP) .................................. 16174020

(51) Int. Cl.
| | |
|---|---|
| *H02K 3/28* | (2006.01) |
| *H02K 1/14* | (2006.01) |
| *H02K 3/18* | (2006.01) |
| *H02K 3/34* | (2006.01) |
| *H02K 5/04* | (2006.01) |

(52) U.S. Cl.
CPC ............. *H02K 3/28* (2013.01); *H02K 1/148* (2013.01); *H02K 3/18* (2013.01); *H02K 3/345* (2013.01); *H02K 5/04* (2013.01); *H02K 2203/03* (2013.01); *H02K 2213/12* (2013.01)

(58) Field of Classification Search
CPC .. H02K 1/14; H02K 3/18; H02K 3/34; H02K 5/04; H02K 1/148; H02K 3/28; H02K 3/345
USPC .................................................. 310/179–210
See application file for complete search history.

(56) References Cited

U.S. PATENT DOCUMENTS

| | | | | |
|---|---|---|---|---|
| 3,735,169 A | * | 5/1973 | Balke ..................... | H02K 3/487 310/214 |
| 2011/0148244 A1 | * | 6/2011 | Bliemeister ............. | H02K 3/38 310/215 |
| 2012/0194028 A1 | * | 8/2012 | Rhoads ................... | H02K 3/34 310/215 |
| 2013/0162072 A1 | * | 6/2013 | Mizutani ................ | H02K 3/522 310/71 |

(Continued)

FOREIGN PATENT DOCUMENTS

| | | | | |
|---|---|---|---|---|
| DE | 102006048967 A1 | * | 4/2008 | ............. H02K 3/345 |
| DE | 102006048967 A1 | | 4/2008 | |
| JP | 2002171704 A | | 6/2002 | |

(Continued)

OTHER PUBLICATIONS

JP-2014011900-A—JPO machine translation, all pages, Takemura (Year: 2014).*

(Continued)

*Primary Examiner* — Naishadh N Desai
(74) *Attorney, Agent, or Firm* — Cantor Colburn LLP (57) ABSTRACT

A stator connected to a power supply includes a plurality of wound segment assemblies, each wound segment assembly comprising a segmented corepack stack with a phase winding wound around said segmented corepack stack and a power printed circuit board assembly comprising a printed circuit board (PCB). The stator also includes phase wires connected to said phase winding, said phase wires being connected to said PCB and said PCB being connected to said power supply.

11 Claims, 7 Drawing Sheets

(56) References Cited

U.S. PATENT DOCUMENTS

2015/0008783 A1* 1/2015 Kitaji ...................... H02K 3/34
310/215

FOREIGN PATENT DOCUMENTS

| JP | 2014011900 A | * | 1/2014 |
| JP | 2014011900 A | | 1/2014 |

OTHER PUBLICATIONS

European Search Report for International Application No. 16174020. 4, dated Mar. 3, 2017, 12 pages.
European Search Report for International Application No. 16174020. 4, dated Nov. 28, 2016, 7 pages.

* cited by examiner

STATOR ASSEMBLY

FOREIGN PRIORITY

This application claims priority to European Patent Application No. 16174020.4 filed Jun. 10, 2016, the entire contents of which is incorporated herein by reference.

TECHNICAL FIELD

Stator assembly for use in an electric machine are described herein. The stator assembly may be used as part of a rotary system in electric machines such as motors or generators.

BACKGROUND

Stators are well known as being the stationary part of a rotary system that is typically found in electric machines such as motors and generators. Wound Segmented stator assembly comprise a plurality of wound stator segment assemblies. Each wound segment assembly may comprise a) a stack of stator coreplates (also known as stator plates) forming a Segmented Corepack Stack, b) winding wire, c) insulation slot liners and d) phase separator. Generally, in known wound segmented stator assembly multiple individual stator teeth are typically used.

In known stators, different phase wires of the stator windings would be connected together with brazing and soldering methods with the use of insulation sleeves etc.

SUMMARY

A stator is described that is connected to a power supply, said stator comprising: a plurality of wound segment assemblies, each wound segment assembly comprising a segmented corepack stack with a phase winding 209 wound around said segmented core stack, said stator further comprising: a power printed circuit board (PCB) assembly comprising a printed circuit board, and wherein phase wires are connected to said phase winding, and wherein said phase wires are connected to said PCB and said PCB is connected to said power supply.

In any of the examples described herein, the segmented corepack stack may comprise a plurality of core plates stacked face to face. In any of the examples described herein, the phase wires may be insulated. In any of the examples described herein, the phase wires may be insulated via encapsulation.

In any of the examples described herein, the phase wires may be connected to said PCB via a pin, which in some examples may be a turret pin.

In any of the examples described herein, the power PCB assembly may further comprise a temperature sensor lead secured to the PCB.

In any of the examples described herein, said PCB may comprise holes formed therein and said temperature sensor lead may be routed around the Power PCB between the holes.

In any of the examples described herein, said temperature sensor lead may be secured to said PCB via lacing tape. In any of the examples described herein, the temperature sensors may be fitted between the phase windings 201.

In any of the examples described herein, the stator may further comprise insulation means to insulate the phase winding from the segmented corepack stack around which it is wound and to insulate the phase winding from an adjacent wound segment assembly comprising a segmented corepack stack and windings.

In any of the examples described herein, the stator may further comprise insulation means. In some examples, the insulation means may comprise first and second Slot Liners. In any of the examples described herein, said first slot liner may be positioned onto a first end of the segmented corepack stack and said second slot liner may be positioned onto the second, opposing end of the segmented corepack stack.

In any of the examples described herein, the internal shape of the slot liners corresponds to the external shape of the segmented corepack stack.

In any of the examples described herein, said first and second slot liners may have an identical shape. In any of the examples described herein, each of said slot liners may extend from a first end to a second end and said first and second slot liners may be positioned on the segmented corepack stack so that the second ends of both slot liners contact each other. In any of the examples described herein, at least a portion of the second ends of the slot liners overlap each other to provide full insulation coverage of the segmented corepack stack.

In any of the examples described herein, the second end of each of the slot liners may comprise a first section having a first shape and a second section having a second shape that is different to the first shape and wherein the first shape and the second shape correspond to each other so that when the first section at the second end of the first slot liner contacts and overlaps with the second section at the second end of the second slot liner, the corresponding overlapping first and second sections interlock.

In any of the examples described herein, said slot liner may comprise an inner surface shape that corresponds to an outer surface shape of the segmented core stack. In any of the examples described herein, the segment core stack may comprise a 'T'-shaped cross-section and the slot liners may comprise corresponding 'T'-shaped cross-section.

In any of the examples described herein, the slot liners may comprise an outer shape that is generally 'T'-shaped and wherein at the bottom of the "T-shape", the slot liner comprises a tapered portion, said taper extending outwards and downwards away from the outer surface of the slot liner and extending away from the segmented core stack.

In any of the examples described herein, the slot liner may further comprise a phase winding mounting feature, and said mounting feature may comprise "Start" and "finish" winding grooves or slots.

In any of the examples described herein, the outer surface of the slot liner may be 'T'-shaped and said mounting phase winding mounting feature may be formed in the underside of the portion of the slot liner that forms the upper part of the 'T'-shape. In any of the examples described herein, said slot liner may further comprise a power PCB assembly mounting feature. The power PCB assembly mounting feature may comprise a protrusion and the PCB of the power PCB assembly may comprise a correspondingly shaped slot for receiving said protrusion.

In any of the examples described herein, said slot liner may have a 'T'-shaped outer surface and said power PCB assembly mounting feature may be formed in the underside of the portion of the slot liner that forms the upper part of the 'T'-shape.

In any of the examples described herein, the insulation means may further comprise Phase Separators. The phase separators may comprise an insulation material and may be positioned on each side of the segmented stack so that they extend from between the slot liner and the segmented core pack and along the length of the side of the segmented core stack.

In any of the examples described herein, the segmented corepack stack and the slot liner may both have an outer 'T'-shape and the phase separator may comprise a sheet having an 'r'-shaped cross-section, said sheet being assembled onto a side of the segmented corepack stack and positioned so that the top portion of the 'r'-shape is positioned between the underside of the portion of the segmented corepack stack that forms the top part of the 'T'-shape and the upper side of the portion of the slot liner that forms the 'T'-shape.

In any of the examples described herein, the insulation means may further comprise a taped copper wire.

In any of the examples described herein, the insulation means may further comprise an insulation sheet to isolate the Power PCB Assembly.

A method for connecting a stator to a power supply is also described herein, said method comprising providing a stator having a plurality of wound segment assemblies, each wound segment assembly comprising a segmented core stack with a phase winding wound around said segmented core stack, said method further comprising providing a power printed circuit board (PCB) assembly comprising a PCB, connecting said phase winding to phase wires and connecting said phase wires to said PCB and connecting said PCB to said power supply.

A method of inserting a stator into a housing is also described comprising: providing a stepped bore or recess in said housing, heating said housing to 210° C. and inserting said stator into said heated housing.

This method may be used with any of the stators described herein.

A stator is also described herein that may comprise a first end and an opposing second end and may further comprise a first section at said first end and a second section at said second end, wherein said first section has an outer diameter D1 that is smaller than an outer diameter D2 at said second section.

A housing with a stator received therein is also described wherein said stator is received within said housing and wherein the stator comprises a varying external diameter along its length and between the ends of the stator that corresponds to a varying internal diameter along the internal length of the housing in which the stator is positioned, so that a greater interference fit is achieved between the stator and the housing at the ends of the stator than in the middle of the stator.

A housing for receiving a stator is also described herein. The housing may comprise a first end having a first section and an opposite second end having a second section, and said first section of the housing may have an internal diameter D3 that is smaller than an internal diameter D4 of said second section. The housing may further comprise an opening at its second en for receiving said stator.

In some examples, the housing may be used in conjunction with any stator and also with any of the stators described herein. The housing may comprise the stator received therein so that the first section of the stator is in contact with the first section of the housing and the second section of the stator is in contact with the second section of the housing.

In some examples, the housing may further comprise a third section between the first and second sections of the housing, wherein the third section comprises an internal diameter that is greater than the first and second diameters.

DETAILED DESCRIPTION

In known segmented stators, different phase wires of the stator windings would be connected together with brazing and soldering methods with the use of insulation sleeves etc. Unfortunately, this process requires lot of assembly time and requires special skills.

The examples of the new types of stators described herein with reference to the figures therefore aim to overcome this problem with known stators. The examples described herein also provide improved reliability and easier installation and handling, as well as offering a reduced assembly time and further providing a neat connection end design of the stator.

In known segmented stators multiple individual wound segment assembly are typically used. The connection points between these wound segment assemblies often comprise a star connection and connection of individual phases. Due to this particular design of known segmented stators however, there is a possibility, (for example, perhaps during installation and/or operation) that the wound segment assembly may separate due to handling and fatigue.

Figure 1A:
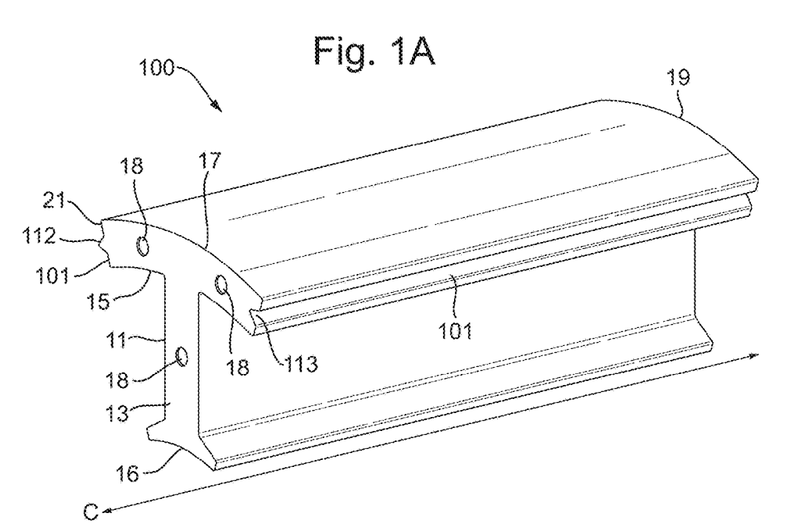
FIG. 1A depicts a perspective view of a coreplate segment stack.
Figure 1B:
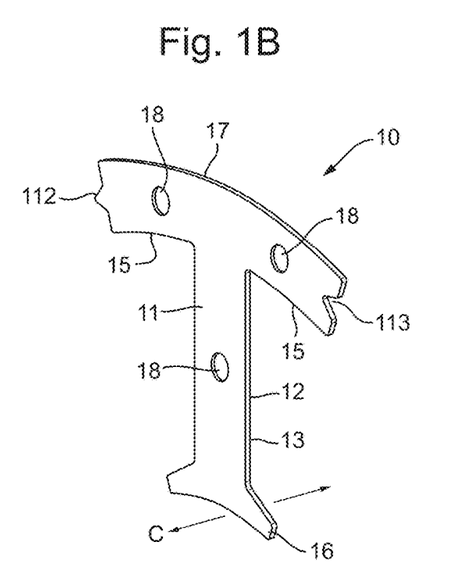
FIG. 1B depicts one of the coreplates of FIG. 1A

An example of a type of coreplate 10 that may be used with any of the examples described herein is shown in FIG. 1B. A plurality of these coreplates 10 may be stacked together as is known in the art to create a Segmented Corepack Stack 100, also known as a segment stack, as is shown in FIG. 1B. This stack may then form the wound segment assembly.

As can be seen in FIG. 1A, which depicts a cross-sectional view of the coreplate 10, the coreplates of this example may have a generally 'T'-shaped cross-section, comprising a first, leg portion 13 extending radially relative to the central axis C of the wound stator assembly (once assembled) from a first end 16 that is closest to the central axis C to a second end 17 that is furthest away from the central axis C, with a second portion 15 extending generally perpendicularly to the first portion 13 and circumferentially relative to the central axis C (thereby forming the top of the "T" shape). Other shapes of coreplates 10 may also be used in the examples of stators described herein.

In some examples, the segmented corepack stack may be made up using a plurality of these individual coreplates 10 stacked together, face to face, using an interlocking or half shear method. As can be seen in FIG. 1B, the half shear method may be achieved due to each plate 10 having a first face 11 and an opposing second face 12 with circular depressions 18 being extruded into the first face 11 and therefore three corresponding protrusions being extruded into the second face 12 of each plate. The second face 12 of one plate 10 will then contact the first face 11 of the adjacent plate 10 in the corepack stack and vice versa to enable the plurality of plates 10 to click into place relative to each other via these corresponding circular protrusions/extrusions 18. Any number of extrusions/protrusions 18 may be used, however, in the examples shown in FIGS. 1A and 1B, wherein the plate is 'T'-shaped, three are provided to click each section of the "T-shape" into place.

Figure 3:
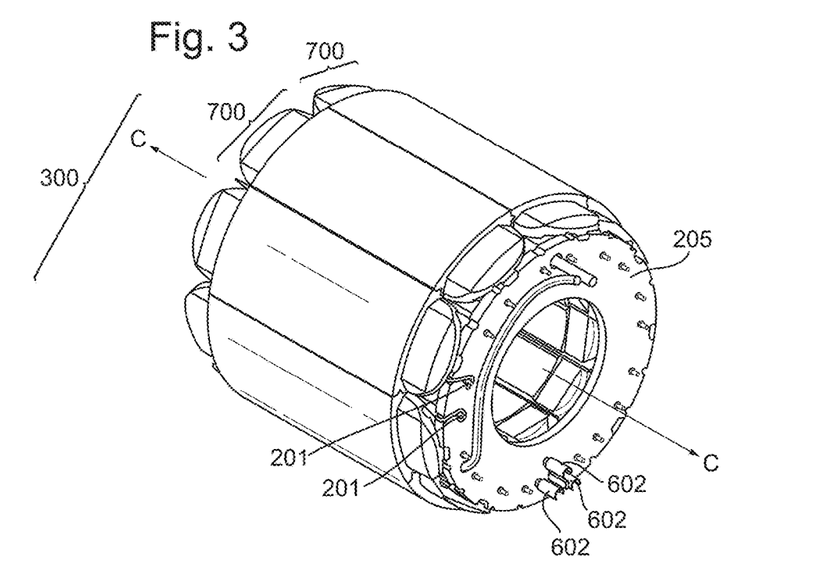
FIG. 3 depicts a perspective view of a stator, showing the position of the Power PCB Assembly and power PCB Assembly connection.
Figure 7:
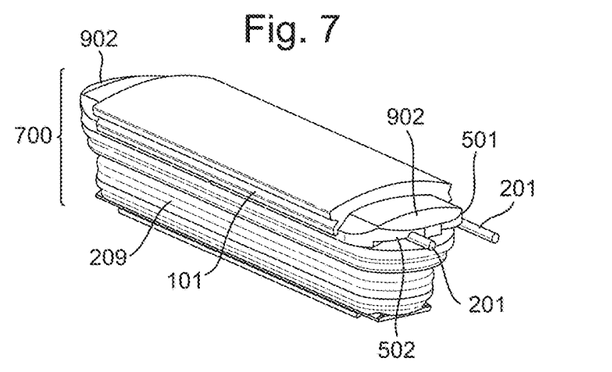
FIG. 7 depicts the positioning of wound coils on a segmented corepack stack with the phase separator removed.

A plurality of segmented corepack stacks are used and phase windings 209 are wound around each of these segmented corepack stacks (and around the slot liners 902 as described later) to form a plurality of wound stator segment assemblies 700 as shown in FIG. 7. These wound stator segment assemblies 700 may then be stacked side by side and side edge 101 to side edge 101 circumferentially about a central axis C (as shown in FIG. 3) so that the side edges 101 of the top part 15 of the "T-shape" contact each other, as is shown in FIG. 3 which depicts a stator 300.

As can be seen in FIGS. 1A and 1B, the top portion of the "T-shape", i.e. the portion 15 of the coreplate 10 that is extending circumferentially to the axis C may also comprise first and second triangular side features, 112, 113. These triangular side features may comprise a first triangular feature 112 on one end of the second portion 15 that is male whereas the triangular feature 113 on the opposite end of the second portion 15 is female. Each coreplate 10 therefore comprises one male 112 and one female 113 triangular section that correspond in shape and size to each other. These triangular features therefore provide assembly aides to form the final circular stator assembly in that the male feature 112 of one Segmented Corepack Stack 100 will slot into the female feature 113 of the adjacent Segmented Corepack Stack 100. These triangular side features 112, 113 also work as a faultless assembly feature as they can only be fitted in one single direction.

In summary, in some examples, the Segmented Corepack Stack 100 (i.e. the plurality of coreplates 10 stacked together) may be made from multiple coreplates 10 of different thicknesses made of magnetic iron alloy sheets that are held together with an interlock or half shear method as described above. These triangular side features 112, 113 on each of the coreplates 10 may therefore be used as a location feature and thereby stop the segments 100 from falling apart during the assembly, installation and operation. The invention defined herein is not limited to these features, however, and other coreplate shapes may be used.

As is known in the art, each of the Segmented Corepack Stack 100 shown in FIGS. 1A and 1B may be wound with 3-phase concentrated type windings to form a wound stator assembly 700 as shown in FIG. 7. As described above, traditionally, in known stators, the different phases of the stator windings would be connected together with brazing and soldering methods. The examples of the new wound stator segment assembly 700 described herein however, aim to overcome the disadvantages associated with this by providing a new way of connecting the stator windings to the power input.

Figure 2A:
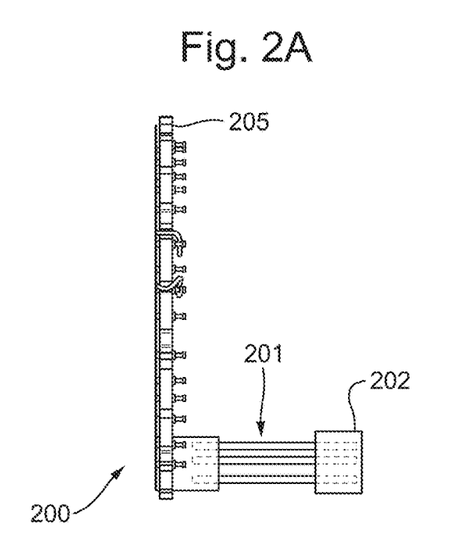
FIG. 2A depicts a side view of a Power PCB Assembly.
Figure 2B:
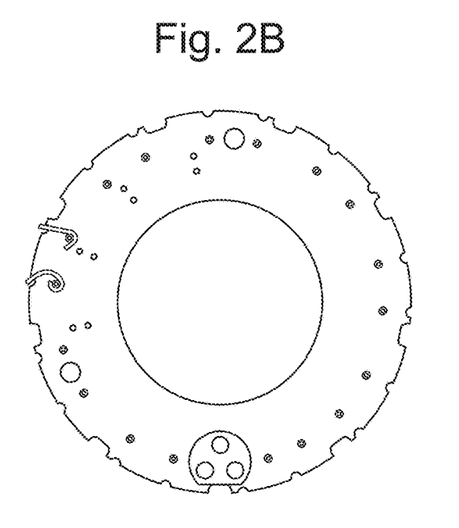
FIG. 2B depicts a front view of a Power PCB Assembly.

In summary, the examples of stators described herein may comprise a plurality of wound stator segment assemblies 700 and may further comprise a printed circuit board (PCB) assembly 200 with internal tracks or connections that are specifically designed to electrically connect the wound stator segment assemblies 700 to each other as well as to a power supply 202 (via the power input phase wires 201). Since this may be achieved by soldering, it therefore reduces the production and assembly times and makes the assembly much easier compared to known stator assembly procedures. This is depicted in FIGS. 2A, 2B and 3.

This Power PCB assembly 200 therefore provides electrical connections of the different wound stator segment assemblies 700 as well as to the power supply 202. An example of the Power PCB assembly 200 is shown in FIGS. 2A and 2B. FIG. 2A is a side view of the power PCB assembly 200 and depicts how the phase wires 201 which are connected to a printed circuit board (PCB) 205 extend from the PCB 205 to the power supply 202.

FIG. 3 depicts how the Power PCB assembly 200 may be connected to the Segmented Corepack Stacks 100 of the stator 300. In some examples, the stator 300 may comprise a plurality of wound stator segment assemblies 700 and in the example shown in FIG. 3, nine wound stator segment assemblies 700 are shown, and are stacked together circumferentially about the central axis C. The invention is not limited to this number, however, and any number of wound stator assemblies 700 may be used.

Figure 6:
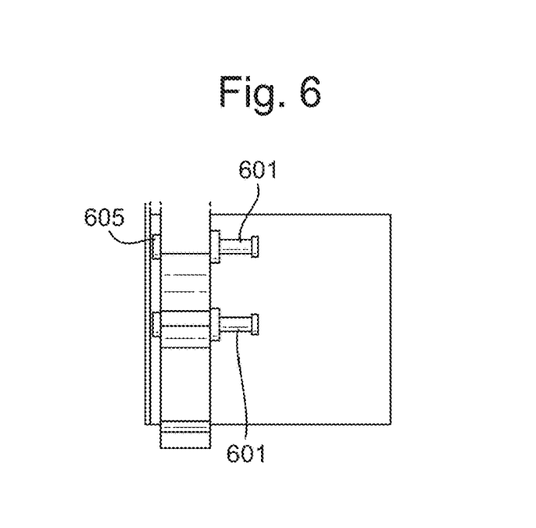
FIG. 6 depicts pins for attaching to the PCB

The phase wires 201 of each wound stator segment assembly 700 may be soldered to the PCB 205 via the use of relatively small swaged turret pins 601, as shown in FIG. 6, instead of brazing or soldering wires, thereby easing the assembly. Relatively larger turret pins 602 may also be selected to connect the phase wires 201 to the PCB 200 as shown in FIG. 3. These pins 602 may be used instead of solder pads to providing better structural strength under harsh conditions such as vibrations etc. Encapsulated/Potted phase wires 201 may also be used to reduce the distance between the pins 602 for space saving and for improving the structural strength under harsh conditions such as vibrations etc. In FIG. 3, three pins 602 can be seen for connecting the phase wires to the PCB, however, any number of pins may be used. Due to the fact that the phase wires 201 may be insulated/encapsulated these pins can be provided relatively close to each other on the PCB 205.

Figure 4:
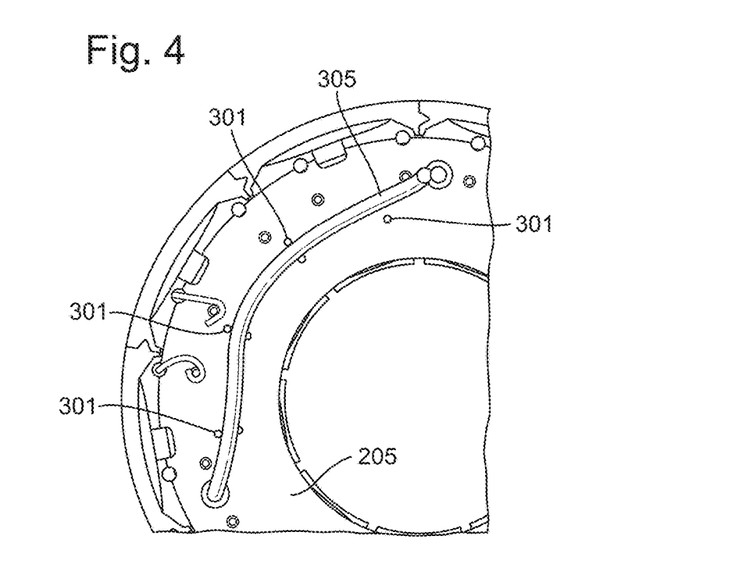
FIG. 4 depicts the positioning of temperature sensor leads mounting and Power PCB Assembly mounting

In some examples, and as shown in FIGS. 3 and 4, the Power PCB assembly may further support temperature sensor leads 305 that are routed around the Power PCB assembly 200 between holes 301 that are formed in the PCB 205. These may be secured to the Power PCB assembly 200 by lacing tape. The temperature sensors 305 are fitted between the phase windings 201. Temperature sensors 305 give accurate readings on the motor temperature as part of system health monitoring.

The examples described herein may also comprise phase separator insulation means to insulate the phase winding 201 from the segment corepack stack 100 around which it is wound and also to insulate the phase winding 201 from the phase winding 201 of an adjacent wound segment assembly 700. In some examples, the insulation scheme may comprise Slot Liners 902, Phase Separators 801, taped copper wire 201 and an insulation sheet 605 to isolate the Power PCB Assembly 200.

Figure 8A:
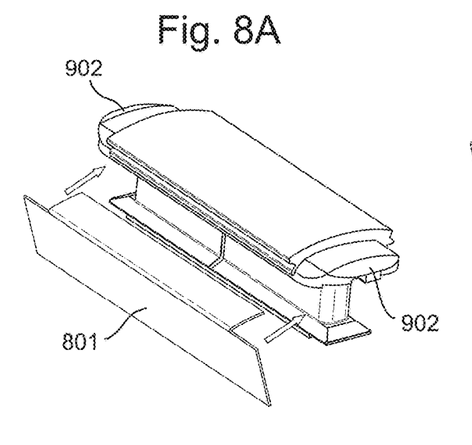
FIG. 8A depicts a phase separator before being assembled with the wound stator segment assembly.
Figure 8B:
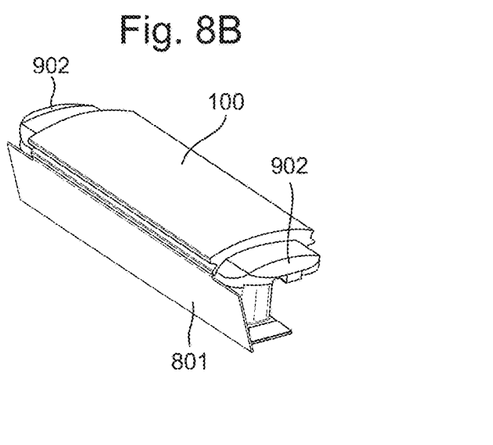
FIG. 8B depicts a phase separator after being assembled with the wound stator segment assembly.
Figure 8C:
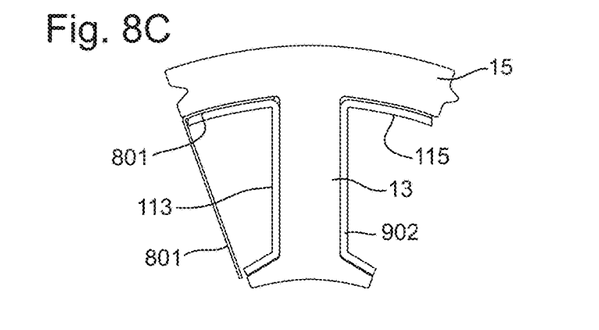
FIG. 8C depicts a cross-sectional view of the wound stator segment assembly showing phase separator after assembly without winding wire.

As is known in the art, slot liners are used to insulate electric coils or phase windings 201 from a magnetic core of a stator. They are able to provide voltage resistance at high temperatures and also offer protection from electrical and mechanical stress. The Slot Liner 902 shown in FIG. 9 may therefore provide electrical insulation between the phase windings 201 and between each corepack segment stack 100. The slot liners 902 of the examples described herein may be interchangeable with each other in that they have a mirrored design so that each slot liner 902 may be used on either end of the corepack segment stack 10 as shown in FIGS. 8A to 8C. This allows the installation of the same part number on both ends of the corepack segment stack and reduces the item inventory.

Figure 9A:
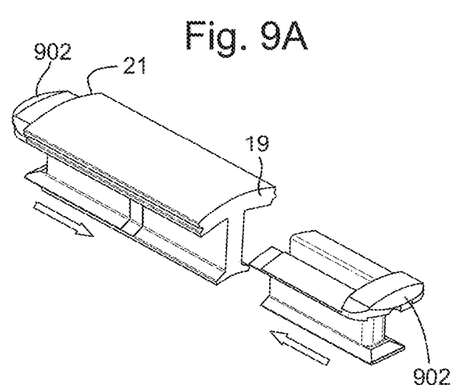
FIG. 9A depicts a Segmented Corepack Stack with one insulation slot liner assembled thereon and a second insulation slot liner prior to assembly.

In detail, and as shown in FIG. 9A, the segmented corepack stack 100 may comprise a plurality of coreplates 10, stacked adjacent to each other between a first end 21 and a second end 19 of the segmented corepack stack 100.

Figure 9B:
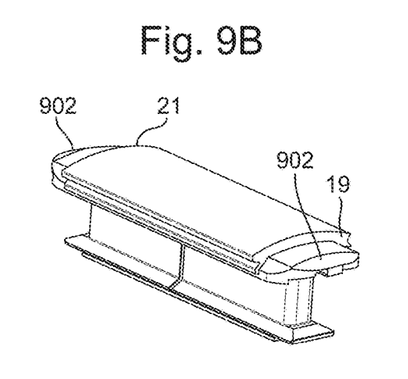
FIG. 9B depicts two slot liners assembled with the Segmented Corepack Stack.

A first slot liner 902 may then be assembled onto the first end 21 of the segmented corepack stack 100, whilst a second slot liner 902 may be assembled onto the second, opposing end of the segmented corepack stack 100 as is shown in FIG. 9A. The internal shape of the slot liners 902 may correspond to the external shape of the segmented corepack stack 100 so that the slot liners 902 can be assembled thereon by being slid into position along the external surface of the of the segmented corepack stack 100 with ease. FIG. 9A depicts a Segmented Corepack Stack 100 with one insulation slot liner 902 already positioned thereon and with a second insulation slot liner 902 prior to being slid into position on the segmented corepack stack 100. FIG. 9B depicts two slot liners 902 that have already been assembled with and positioned on and around the Segmented Corepack Stack 100.

Figure 9C:
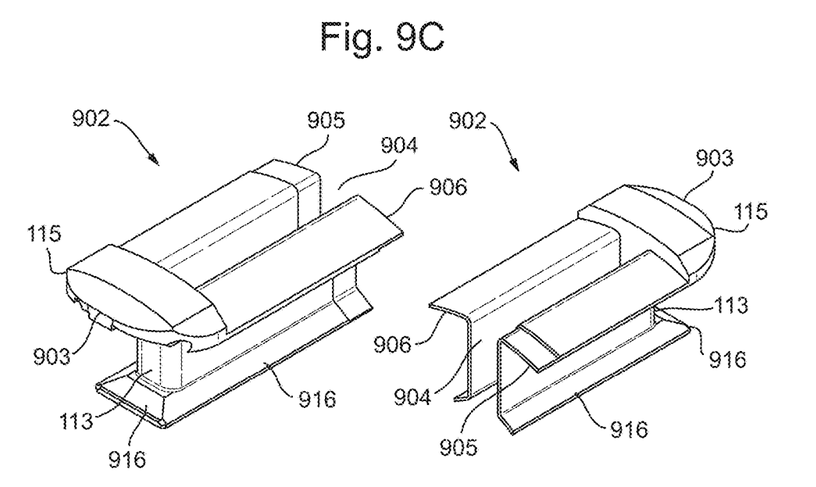
FIG. 9C depicts perspective views of insulation slot liners showing engagement features.

FIG. 9C depicts first and second slot liners 902 in detail. Each slot liner 902 may therefore be described as extending from a first end 903 to a second end 904 and the slot liners may be positioned on the corepack segment stack 100 so that the slot liners 902 may be moved towards each other until the second ends 904 contact each other. In some examples, at least a portion of the second ends 904 of the slot liners 902 may overlap to provide full insulation coverage of the segmented corepack stack 100. In some examples, the second end 904 of the slot liners 902 may have a first section 905 having a first shape and a second section 906 having a second shape that is different to the first shape. The first shape of the first section 905 and the second shape of the second section 906 may, however, correspond to each other (e.g. so that they mirror each other) so that when the first section 905 at the second end 904 of the first slot liner 902 contacts and overlaps with the second section 906 at the second end 904 of the second slot liner 902 the corresponding overlapping first 905 and second 906 sections having correspondingly shaped surfaces interlock. This mirroring feature thereby allows installation of the same shaped slot liner 902 on both the front and back ends of each segmented core stack 100.

In some examples, as described above, the inner surface of the slot liners 902 may have a shape that corresponds to the outer surface shape of the segmented corepack stack 100 around which they are positioned. In some examples, such as that shown in FIG. 9, the segmented corepack stack 100 may have a 'T-shaped cross-section and the slot liners may also have a corresponding 'T'-shaped cross-section. In some examples, such as that shown in FIG. 9C, the outer shape of the slot liners 902 may therefore be described as being generally 'T'-shaped. In this example, however, the bottom of the leg 113 of the 'T'-shape may further comprise a tapered leg design 916, wherein the outer surface of the slot liner 902 tapers outwards and downwards and extends away from the segmented core stack 100 at the bottom portion (which corresponds to the bottom of the 'T'-shape). This tapering feature provides greater strength and allows for a better end winding formation.

Figure 5:
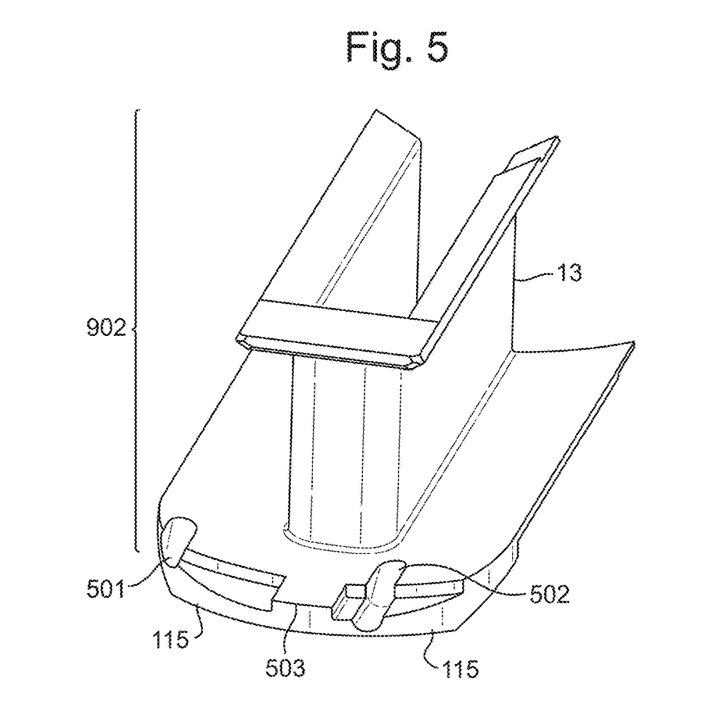
FIG. 5 depicts the underside of the slot liner and the positioning of winding slots (start and finish) and the Power PCB Assembly mounting feature

The Slot liners 902 may further comprise unique mounting features including "Start" 501 and "finish" 502 winding grooves or slots as shown in FIG. 5, which are formed in the underside of the portion 115 of the slot liner that forms the upper part of the "T-shape". The phase winding 201 may therefore be wound around the slot liner 902 and therefore the segmented core stack 100 pack by being aligned with the start slot 501, being wound around the slot liner 902 and finally finishing by being aligned with the finish slot 502 as it leaves and connects with the Power PCB Assembly. This is further shown in FIG. 7 which shows the wound stator segment assembly 700 (comprising the segmented corepack stack with wound coils 201) and how the phase windings are provided in the start and finish slots 501, 502 (with the phase separator insulation (as described below) not shown for reasons of clarity).

FIG. 5 further depicts a power PCB assembly mounting/location feature 503 that may be provided on the slot liner 902. In this example, the power PCB assembly mounting feature 503 is also formed in the underside of the portion 115 of the slot liner that forms the upper part of the "T-shape". Correspondingly shaped slots may also be provided on the Power PCB assembly 200 which therefore allow this mounting feature 503 to be slotted into the slot of the Power PCB Assembly 200. This power PCB assembly location feature 503 acts as an installation aid as well as providing an anti-rotational and mounting aid for the Power PCB assembly.

The slot liner design also allows for the accommodation of a phase separator 801, as shown in FIGS. 8A, 8B and 8C. The phase separator 801 comprises an insulation material that may be positioned on each side of the segmented corepack stack 100 so that it extends from between the slot liner 902 and the segmented corepack stack 100 and along the length of the side of the segmented corepack stack 100, as shown in FIG. 8B. In the example shown in FIG. 8A to 8C, wherein the segmented core stack 100 and the slot liner 902 both have an outer 'T'-shape, the phase separator 801 may be provided in the form of a sheet having an 'R'-shaped cross-section as shown in FIG. 8C. In some examples, the material may comprise Nomax 410; however, other insulation materials may also be used.

Each phase separator 801 may be assembled onto one side of the segmented corepack stack 100 and positioned so that the top portion of the 'R'-shape is positioned between the underside of the portion 15 of the corepack segment stack 100 that forms the top part of the 'T'-shape and the upper side of the portion 115 of the slot liners 902 that forms the 'T'-shape, as shown in FIG. 8C. FIG. 8A depicts the phase separator 801 before it has been assembled, whereas FIG. 8B depicts the phase separator 801 after assembly between the segmented corepack stack 100 and insulation slot liner 902.

Each individual wound segment assembly 700 comprising the corepack segment stack 100, windings 201, slot liners 902 and phase separator 801 may then be connected to the Power PCB assembly 200 to create electrical connections there between as described above.

In some examples, the stator 300 may therefore be described as comprising a plurality of the wound segment assemblies 700 as described above, each of which comprise insulations (including the slot liner 902 and phase separator 801), winding coils 201, (that in some examples may comprise corona resistant tape wrapped copper wire), as well as a temperature sensor(s) 305, (held together with the help of tooling), then being connected electrically with each other and the power supply with the help of Power PCB assembly 201. The power PCB assembly 201 may then be lashed to the wound stator assembly to secure it into position before being impregnated with impregnation varnish.

Figure 10:
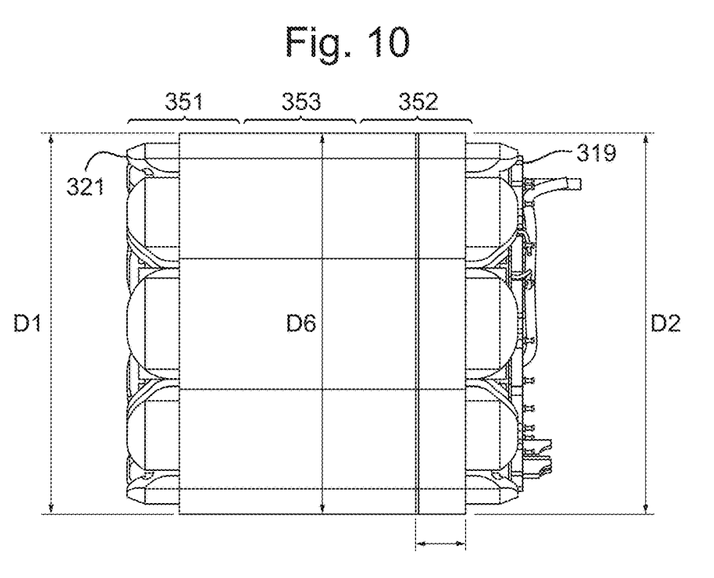
FIG. 10 depicts a side view of a stator according to any of the examples described herein.

In addition to the above, a new type of stator housing and new method of installing the stator in the housing is described with reference to FIGS. 10 and 11. Traditionally, in use, a stator would be held in its housing by keeping the entire stator length under interference fit providing hoop stress and the tight dimensional control for interference fit achieved by grinding the Stator Assembly Outer Diameter. This keeps the wound stator assembly under stress at all times, and hence reduces the performance of some high end Corepack Iron materials such as Cobalt Iron. This also makes insertion of the stator into the stator housing difficult.

In the new examples described below, however, a final post impregnation step may be performed on the stator 300 so that the outer diameter D1 of a first section 351 of the stator 300 at a first end 321 is different to the outer diameter D2 at a second section 352 of the stator 300 at its opposite, second end 319. This may be achieved by grinding. A stator that has undergone this process step is depicted in FIG. 10. In this figure, the stator has a first end 321 and an opposite second end 319. In this example, the stator 300 also has a PCB assembly as previously described, however, the invention is not limited to his and this method can be used with any type of stator. The stator PCB assembly in this example is positioned at the stator's second end 319.

In some examples, the external/outer diameter D1 at a first section 351 of the first end 321 of the stator 300 may be smaller than the external/outer diameter D2 at s second section 352 at the second end 319 of the stator 300. In some examples, the difference in diameter may only be very slight, such as a difference of micrometers. In some examples, the difference may be 100 micrometers; however, the invention is not limited to this.

Figure 11:
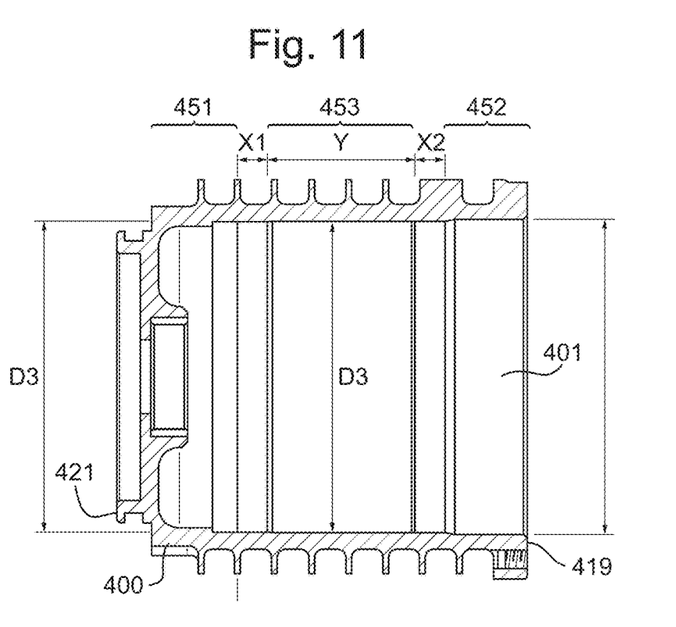
FIG. 11 depicts an example of a new type of housing for receiving a stator.

The housing 400 in which the stator 300 is to be positioned is depicted in FIG. 11. The housing 400 may be described also as having a first end 421 and an opposite second end 419. The second end 419 of the stator housing 400 may comprise an opening 401 for receiving the stator 300. In use, the first end 321 of the stator 300 may be inserted into the opening 401 at the second end 419 of the stator housing 400. Due to the fact that the first end 321 of the stator 300 has first section 351 comprising a first external diameter D1 that is smaller than the diameter of the second section 352 at the second end 319 of the stator 300, the stator may be inserted more easily into the opening 401 of the housing 400.

In addition to this, the housing 400 may also comprise a first section 451 at its first end 421 that comprises an internal diameter D3 that is smaller than the internal diameter D4 at a second section 452 of the housing at its second end 419.

When positioned within the housing 400, diameters D1 to D4 would be relatively sized so that the outer surface of the first section 351 of the stator would be in contact with the inner surface of the first section 451 of the housing and the outer surface of the second section 352 of the stator would be in contact with the inner surface of the second section 452 of the housing. Due to this, at least the first 351 and second 352 sections of the stator 300 would achieve an interference fit with the internal surface of the housing 400 at the corresponding first and second sections of the housing 400.

In some examples, the housing 400 may further be modified so that a section 453 that is between the first 451 and second 452 sections of the housing has an internal diameter D5 that is greater than all of the diameters D1 to D4 and that is also greater than the external/outer diameter D6 of a section 353 of the stator 300 that is between the first and second sections at its first 321 and second ends 319. This creates a unique stepped bore feature internally of the housing wherein at this section 453, (in comparison to the sections 351, 352, 451, 452 at the ends of the stator and housing) there is minimal or reduced interference fit, or indeed no interference fit at all, with the outer surface of the stator. This section 453 may therefore be described as being a relief area, which reduces the amount of the interference fit length and also reduced hoop stresses through the entire length of the stator. This allows the stator corepack to achieve the best possible magnetic properties.

In use, the housing 400 may be heated to 210° C. and the stator 300 may then be dropped into the housing 400 before it cools. This also reduces the stress on the corepack. This new method therefore allows easy installation into the housing as well and reduces the assembly time. It is also a safer method than before.

The invention claimed is:
1. A stator connected to a power supply, said stator comprising:
  a plurality of wound segment assemblies,
  each wound segment assembly comprising a segmented corepack stack with a phase winding wound around said segmented corepack stack,
  said stator further comprising:
  a power printed circuit board (PCB) assembly comprising a printed circuit board (PCB),
  said phase winding being connected to phase wires, said phase wires being connected to said PCB and said PCB being connected to said power supply; and
  insulation means to insulate the phase winding (201) from the segmented corepack stack (100),
  wherein said insulation means comprises first and second Slot Liners (902) and Phase Separators (801),
  wherein the segmented corepack stack (100) and the slot liner (902) both have an outer 'T'-shape and the phase separator (801) comprises a sheet having an 'r'-shaped cross-section,
  said sheet being assembled onto a side of the segmented corepack stack (100) and positioned so that the top portion of the 'r'-shape is positioned between the underside of the portion (15) of the corepack segment stack (100) that forms the top part of the 'T'-shape and the upper side of the portion (115) of the slot liners (902) that forms the 'T'-shape.

2. The stator of claim 1, wherein the insulation means insulate the phase winding from the segmented corepack stack around which it is wound and to insulate the phase winding from an adjacent segmented corepack stack with windings.

3. The stator of claim 2 wherein the first and second Slot Liners isolate the Power PCB Assembly from said phase winding.

4. The stator of claim 3 wherein said first slot liner is positioned onto a first end of the segmented corepack stack and said second slot liner is positioned onto the second, opposing end of the segmented corepack stack.

5. The stator of claim 3 wherein each of said slot liners extend from a first end to a second end and said first and second slot liners are positioned on the segmented corepack stack so that the second ends of both slot liners contact each other.

6. The stator of claim 3 wherein at least a portion of the second ends of the first and second slot liners overlap each other to provide full insulation coverage of said segmented corepack stack.

7. The stator of claim 3 wherein the second end of each of the slot liners comprises a first section having a first shape and a second section having a second shape that is different to the first shape and wherein the first shape and the second shape correspond to each other so that when the first section at the second end of the first slot liner contacts and overlaps with the second section at the second end of the second slot liner, the corresponding overlapping first and second sections interlock.

8. The stator of claim 3 wherein the slot liners comprise an outer shape that is 'T'-shaped and wherein at the bottom of the 'T'-shape, the slot liner comprises a tapered portion, said taper extending outwards and downwards from the outer surface of the slot liner and extending away from the segmented corepack stack.

9. The stator of claim 3 wherein the slot liner further comprises a phase winding mounting feature, said mounting feature comprising "Start" and "finish" winding grooves or slots for receiving said phase winding.

10. The stator of claim 3 wherein said slot liner further comprises a power PCB assembly mounting feature for locking said slot liner into position relative to said PCB, said power PCB assembly mounting feature comprising a protrusion and wherein said PCB further comprises a corresponding shaped slot for receiving said protrusion.

11. The stator of claim 3 wherein the phase separators comprise an insulation material that is positioned on each side of the segmented corepack stack so that it extends from between the slot liner and the segmented corepack stack and along the length of the side of the segmented corepack stack.

* * * * *